E. C. MANSFIELD.
SASH STOP.
APPLICATION FILED FEB. 18, 1913.
1,073,261.
Patented Sept. 16, 1913.
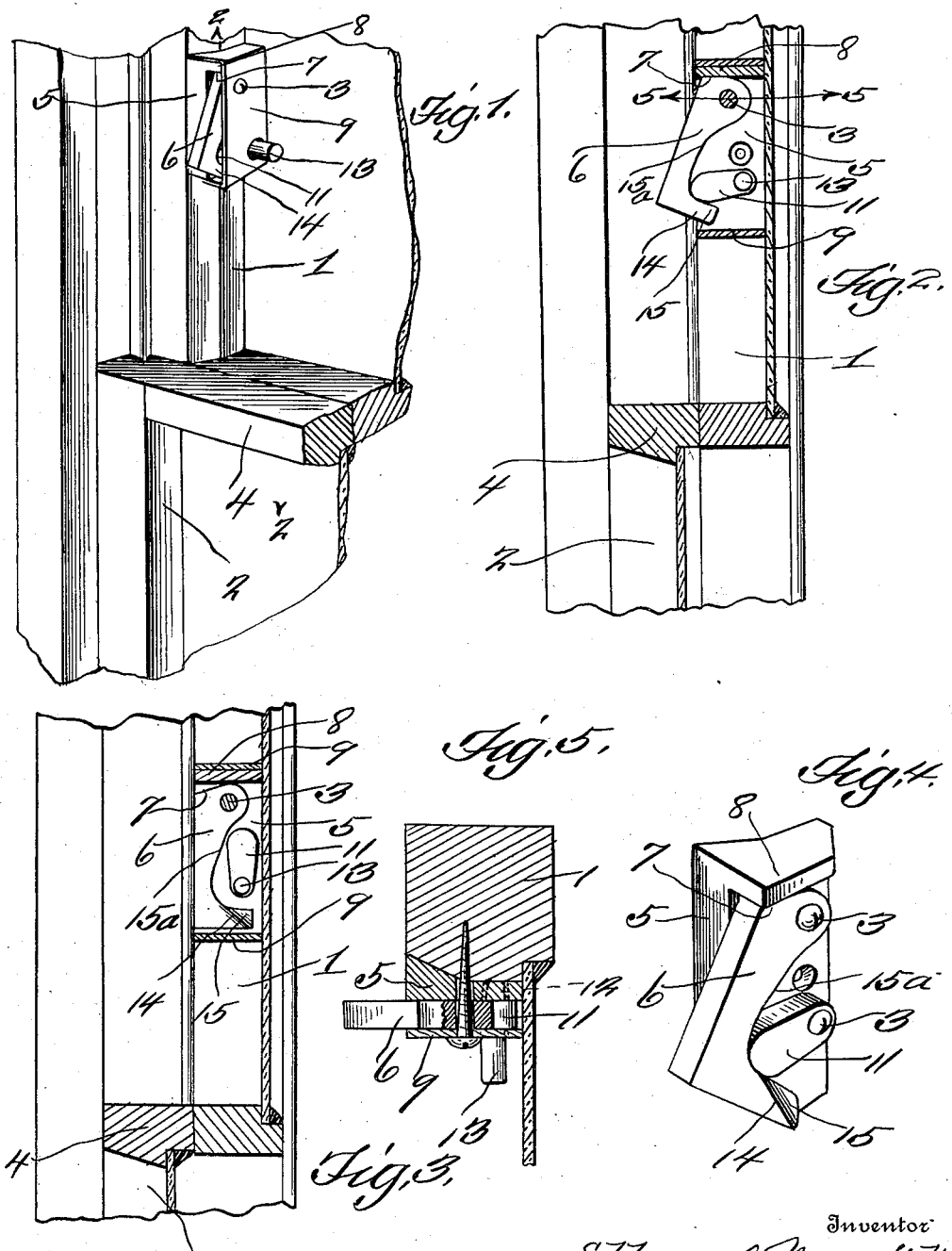

UNITED STATES PATENT OFFICE.

ELLERY C. MANSFIELD, OF MEREDITH, NEW HAMPSHIRE.

SASH-STOP.

1,073,261. Specification of Letters Patent. Patented Sept. 16, 1913.

Application filed February 18, 1913. Serial No. 749,119.

*To all whom it may concern:*

Be it known that I, ELLERY C. MANSFIELD, a citizen of the United States, residing at Meredith, in the county of Belknap and State of New Hampshire, have invented a new and useful Sash-Stop; and I do hereby declare the following to be a full, clear, and exact description of the invention, such as will enable others skilled in the art to which it appertains to make and use the same.

This invention relates to the art of window construction, and particularly a new and useful sash stop.

As one of the objects of the invention, it is the aim to provide an improved sash stop so constructed and arranged, as to render it exceedingly difficult, or rather approximately impossible for a burglar to manipulate the stop from the outside, that is, when the upper and lower sashes are partly open, thereby preventing the burglar from gaining entry through the partly open window.

One of the features of the invention is the provision of an inverted L-shaped plate adapted to be fastened to one side of the upper sash, and provided with a pivoted dog to be thrown in the path of the lower sash, to prevent the raising of the lower sash, or the lowering of the upper sash, the lateral portion of the L-shaped plate acting as an abutment to limit the pivoted dog in its outward movement.

Another feature of the invention is the provision of a pivoted tongue, adapted to be thrown to hold the pivoted dog in its outward movement, the dog having a lug to limit the tongue in its outward movement.

In practical fields the minor features of construction may necessitate alterations, to which the patentee is entitled, provided the alterations fall within the scope of what is claimed.

The invention comprises further features and combination of parts, as hereinafter set forth, shown in the drawings and claimed.

In the drawings: Figure 1 is a view in perspective showing the application of the improved sash stop. Fig. 2 is a sectional view on line 2—2 of Fig. 1, showing the pivoted dog thrown in the path of the lower sash. Fig. 3 is a view showing the pivoted dog thrown from the path of the sash. Fig. 4 is a perspective view showing the cover plate removed, and the lateral finger lug of the tongue eliminated. Fig. 5 is a sectional view on line 5—5 of Fig. 2.

Referring more particularly to the drawings, 1 designates the upper sash while 2 denotes the lower sash. Fastened by means of two screws 3 to the upper sash, a short distance above the upper rail 4 of the lower sash is an inverted L-shaped plate 5. Pivoted upon one of the screws 3 is a dog 6, the upper portion 7 of which is designed to contact with the lateral extending portion 8 of the L-shaped plate, to limit the dog in its outward movement. A cover plate 9 is also secured in place by one of the screws, for the purpose of shielding the dog against being manipulated by a burglar. Arranged between the cover plate and the L-shaped plate is a tongue 11, the pin 12 of which extends into the L-shaped plate to act as a pivot while the finger lug 13 extends through the cover plate, acting as an additional pivot. This tongue is adapted to be thrown against the pivoted jaw, in order to throw the dog in the path of the lower sash, and constituting means to hold the dog in the path of the sash. The lower portion of the dog terminates in a lateral projection, with which the tongue engages, to limit the downward movement of the tongue. This projection 14 is provided with a beveled off portion, to enable the occupant of the room to freely move the tongue 11 to a vertical position, whereby the pivoted dog may return to its normal position from the path of the lower sash, by gravitation. The beveled off portion is designated by the numeral 15.

Just so soon as an operator begins to partially rotate the finger lug, the tongue after being moved a short distance, will fall by gravitation into the position shown in Fig. 2. In Fig. 4 the cover plate is dispensed with, in which case the operator takes hold the tongue 11 to move the same.

In moving the tongue 11, the free curved end of the same has to be forced by the straight portion 15ª of the dog. It will be noted that when the dog is thrown outwardly to its fullest extent in the path of the lower sash, it being limited in such a position by the lateral portion of the L-shaped plate, the free end of the tongue 11 assumes a position slightly below the pivot of the tongue.

When the dog is thrown in the path of the lower sash, it is approximately impossible for a burglar to reach the sash stop to operate the same, under the lower sash, or over the upper sash, that is, when the sashes are slightly opened for ventilation.

The invention having been set forth, what is claimed as new and useful is:—

1. In a sash lock and stop adapted to be secured to one of the side rails of an upper sash offset above the lower rail thereof, an L-shaped inverted plate, a suspended dog pivoted to said plate and constructed and arranged to contact with the L-portion of the plate to limit the dog in its outward movement, said dog terminating at its lower end in a lateral projection extending rearwardly and provided with a crotch between the projection and the body of the dog, a tongue pivoted to said plate rearwardly of said dog and adapted to be thrown outwardly and downwardly slightly below the center of its pivot to enter the crotch to hold the dog outwardly in the path of the lower sash, thereby constituting means for limiting either the upper or lower sash in its movement, the projection acting as means to limit the tongue in position, said dog being so constructed substantially midway between its pivot and the projection as to necessitate forcing the tongue in its action to snap into the crotch.

2. In a sash lock and stop adapted to be secured to one of the side rails of an upper sash adjacent the glass and offset above the lower rail thereof, an inverted L-shaped plate, a suspended dog pivoted to said plate and constructed and arranged to contact with the L-portion of the plate to limit the dog in its outward movement, said dog having a crotch adjacent its lower end, a tongue pivoted to the plate and adapted to be thrown to enter the crotch to hold the dog in its outward position in the path of the lower sash, thereby constituting a stop to limit either the lower sash or the upper sash independently in its movements, said dog adapted to return to its normal position from the path of the lower sash by gravitation when the tongue is withdrawn from the crotch.

In testimony whereof I have signed my name to this specification in the presence of two subscribing witnesses.

ELLERY C. MANSFIELD.

Witnesses:
DEAN SWIFT,
ROBERT A. BOSWELL.

Copies of this patent may be obtained for five cents each, by addressing the "Commissioner of Patents, Washington, D. C."